(12) United States Patent
Sugiura (10) Patent No.: US 10,194,144 B2
(45) Date of Patent: Jan. 29, 2019

(54) PROJECTION IMAGE ADJUSTING SYSTEM AND PROJECTION IMAGE ADJUSTING METHOD

(71) Applicant: Panasonic Intellectual Property Management Co., Ltd., Osaka (JP)

(72) Inventor: Yoshinao Sugiura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/614,616

(22) Filed: Jun. 6, 2017

(65) Prior Publication Data
US 2018/0014008 A1 Jan. 11, 2018

(30) Foreign Application Priority Data
Jul. 7, 2016 (JP) .................................. 2016-135229

(51) Int. Cl.
| | |
|---|---|
| G03B 21/14 | (2006.01) |
| H04N 9/31 | (2006.01) |
| H04N 13/363 | (2018.01) |
| G02B 27/22 | (2018.01) |
| H04N 5/74 | (2006.01) |
| G03B 37/04 | (2006.01) |
| H04N 7/18 | (2006.01) |

(52) U.S. Cl.
CPC ........... *H04N 13/363* (2018.05); *G02B 27/22* (2013.01); *G03B 21/14* (2013.01); *G03B 21/142* (2013.01); *G03B 37/04* (2013.01); *H04N 5/74* (2013.01); *H04N 9/3147* (2013.01); *H04N 9/3179* (2013.01); *H04N 9/3185* (2013.01); *G03B 2206/00* (2013.01); *H04N 7/18* (2013.01)

(58) Field of Classification Search
CPC .. G03B 21/142; G03B 21/145; G03B 21/147; H04N 9/3147; H04N 9/3179; H04N 9/3185; H04N 9/3194
See application file for complete search history.

(56) References Cited

U.S. PATENT DOCUMENTS

| | | | | |
|---|---|---|---|---|
| 2005/0128437 A1* | 6/2005 | Pingali | ................. | H04N 9/3194 353/69 |
| 2012/0236270 A1* | 9/2012 | Maruyama | ............ | H04N 9/317 353/101 |

FOREIGN PATENT DOCUMENTS

| | | |
|---|---|---|
| JP | 2007-226052 | 9/2007 |
| JP | 2008-052641 | 3/2008 |
| JP | 2014-056044 | 3/2014 |

* cited by examiner

*Primary Examiner* — Ryan D Howard
(74) *Attorney, Agent, or Firm* — McDermott Will & Emery LLP (57) ABSTRACT

The projection image adjusting system has a storage, a receiving section, and a controller. The storage stores virtual-environment setting information on a set-up situation of a projection display apparatus set so as to have a desired image-projection state on an object on which an image is projected in a virtual space created by a computer and also stores a control set-up value for the projection display apparatus in the desired image-projection state. The receiving section receives real-environment setting information on a set-up situation of the projection display apparatus in a real space. The controller controls the projection display apparatus in the real space. Based on the virtual-environment setting information and the real-environment setting information, the controller corrects the control set-up value so as to decrease a difference between an image-projection state in the real space and the desired image-projection state.

17 Claims, 8 Drawing Sheets

PROJECTION IMAGE ADJUSTING SYSTEM AND PROJECTION IMAGE ADJUSTING METHOD

BACKGROUND

1. Technical Field

The present disclosure relates to a projection image adjusting system and a projection image adjusting method for projecting image on a 3D structure.

2. Description of the Related Art

A technique for projecting image on a 3D structure, so-called projection mapping is becoming popular. Patent Literature 1 discloses a technique for supporting installation of a projection display apparatus for projection mapping on an event site. Specifically, it discloses technique that generates a layout chart for installation of a projection display apparatus simulated on a virtual space, allowing the user to have an easy set-up with reference to the layout chart of the projection display apparatus on the event site.

CITATION LIST

Patent Literature

PTL 1: Japanese Unexamined Patent Application Publication No. 2014-56044

SUMMARY

When a user locates a projection display apparatus in a real space with reference to a layout chart obtained by simulation, it is difficult to set the display on the first try at the right position shown by the simulation. For adjusting the position, the user has to move the projection display apparatus or has to adjust lenses carefully and repeatedly in the real space. This is very complicated work that imposes much time and effort on the user.

The present disclosure provides a projection image adjusting system and a projection image adjusting method capable of simplifying the installation and adjustment of the projection display apparatus.

The projection image adjusting system as an exemplary embodiment of the present disclosure has a storage, a receiving section, and a controller. The storage stores virtual-environment setting information on a set-up situation of a projection display apparatus set so as to have a desired image-projection state on an object on which an image is projected in a virtual space created by a computer and also stores a control set-up value for the projection display apparatus in the desired image-projection state. The receiving section receives real-environment setting information on a set-up situation of the projection display apparatus in a real space. The controller controls the projection display apparatus in the real space. Based on the virtual-environment setting information and the real-environment setting information, the controller corrects the control set-up value so as to decrease a difference between an image-projection state in the real space and the desired image-projection state, and based on the corrected control set-up value, the controller controls the projection display apparatus in the real space.

The projection image adjusting system as other exemplary embodiments of the present disclosure has a storage, a receiving section, and a controller. The storage stores virtual-environment setting information on a set-up situation of a projection display apparatus set so as to have a desired image-projection state on an object on which an image is projected in a virtual space created by a computer and also stores a shape and a size of a projection image in the desired image-projection state. The receiving section receives real-environment setting information on a set-up situation of the projection display apparatus in a real space. The controller creates a projection image and causes the projection display apparatus in the real space to project the projection image. Based on the virtual-environment setting information and the real-environment setting information, the controller corrects the shape and the size of the projection display apparatus stored in the storage so as to decrease a difference between an image-projection state in the real space and the desired image-projection state, and causes the projection display apparatus in the real space to project the corrected projection image.

According to the present disclosure, the virtual-environment setting information shows the set-up situation of the projection display apparatus when a desired image-projection state with respect to an object on which image is projected is obtained through simulation in the virtual space, whereas the real-environment setting information shows the set-up situation of the projection display apparatus in the real space. Based on the virtual-environment setting information and the real-environment setting information, the structure of the present disclosure corrects the control set-up value so as to decrease a difference between an image-projection state in the real space and a desired image-projection state. Further, based on the corrected control set-up value, the workings of the projection display apparatus are automatically controlled. In this way, installation and adjustment of the projection display apparatus is simplified.

DETAILED DESCRIPTION

Hereinafter, an exemplary embodiment will be described in detail, with reference to the accompanying drawings. However, details beyond necessity—for example, descriptions on well-known matters or on substantially identical structures—may be omitted to eliminate redundancy from the description below for easy understanding of those skilled in the art.

It is to be understood that the accompanying drawings and the description below are provided by the applicant for purposes of full understanding of those skilled in the art and are not to be construed as limitation on the scope of the claimed disclosure.

First Exemplary Embodiment

Hereinafter, the structure of the first exemplary embodiment will be described with reference to FIG. 1 through FIG. 8.

[1-1. Structure]

Figure 1:
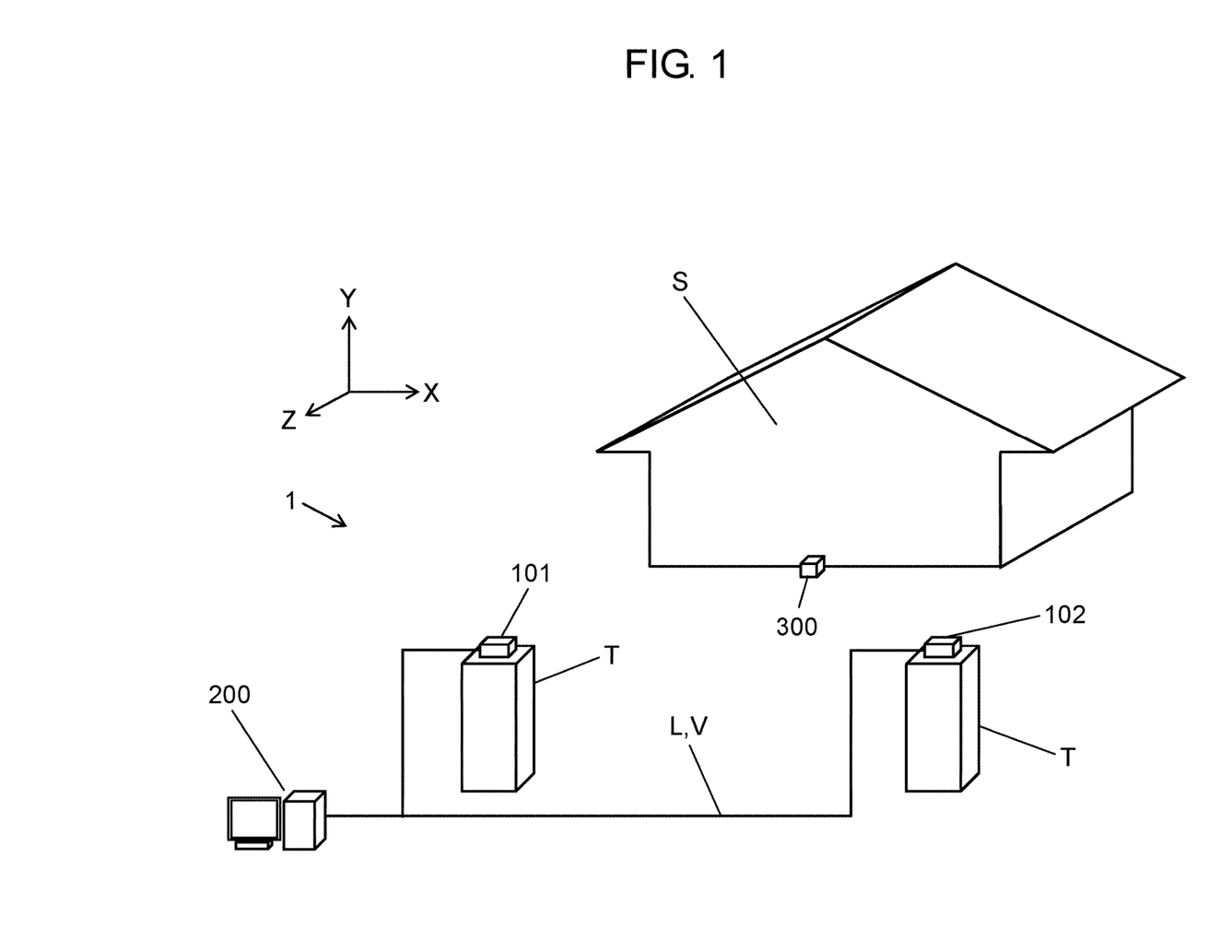
FIG. 1 is a schematic view showing a state in which a projection image adjusting system of an exemplary embodiment is placed in the real space.

FIG. 1 is a schematic view showing a state in which projection image adjusting system 1 of the embodiment is installed in a real space. Projection image adjusting system 1 adjusts an installed condition of projectors 101 and 102 in the real space. Projectors 101 and 102 are placed on bases T. Projectors 101, 102 and adjustment PC 200 are connected by network cable L and video-signal cable V with each other. Position detecting module 300 has, for example, a GPS receiver, a geomagnetic sensor, an acceleration sensor, and a gyro sensor. Disposed at the center of the lower end of a projection wall of structure S, position detecting module 300 detects the position and direction of the projection wall of structure S. The position of the projection wall is represented by, for example, the latitude and longitude showing the center of the projection wall. The direction of the projection wall is represented by, for example, the angle to the Z-axis of the normal line on the projection wall. Position detecting module 300 communicates with adjustment PC 200 via radio wave, but they are not necessarily connected by air; they may communicate via wire. Projectors 101 and 102 are an example of a projection display apparatus, and structure S is an example of an object on which image is projected.

Figure 2:
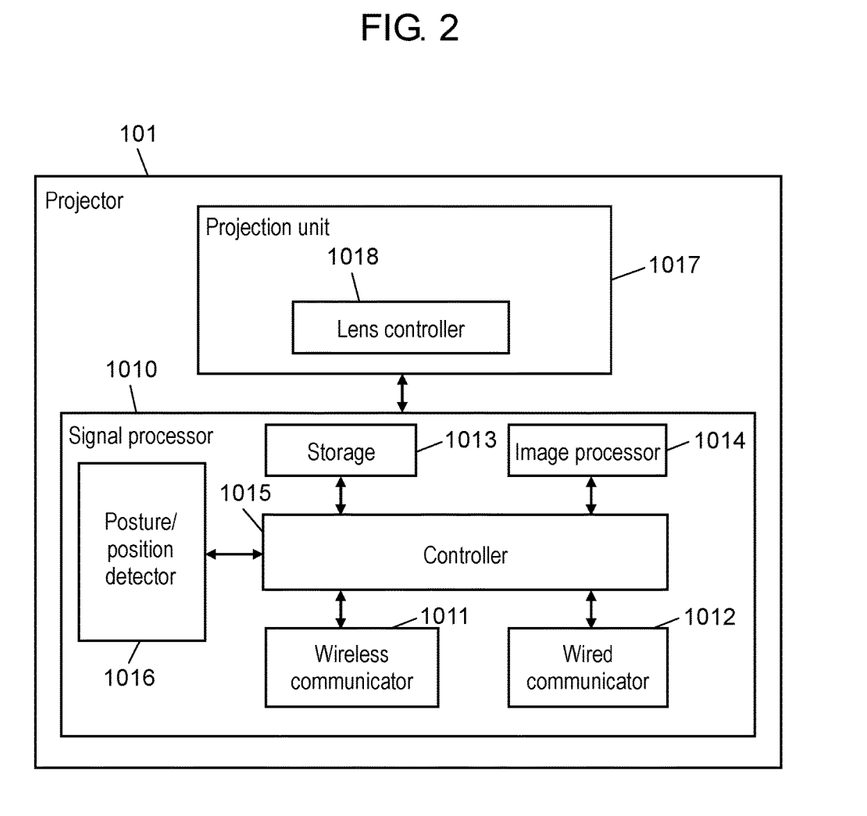
FIG. 2 is a functional block diagram of a projector.

FIG. 2 is a functional block diagram of projector 101 used in the first exemplary embodiment. The description will be focused on projector 101 because projector 102 has a structure the same as projector 101. Projector 101 has signal processor 1010 and projection unit 1017 that projects image onto a projection wall. Signal processor 1010 further has wireless communicator 1011 for wireless communication, wired communicator 1012 for wire communication, storage 1013, image processor 1014, controller 1015, and posture/position detector 1016. Posture/position detector 1016 has, for example, a GPS receiver, a geomagnetic sensor, an acceleration sensor, and a gyro sensor. Posture/position detector 1016 detects the position, direction, and tilt of projector 101. The position of projector 101 is represented by the latitude and longitude showing the installed position of projector 101. The direction is represented by the angle of the reference direction of projector 101 with respect to the north-south direction. The tilt is represented by an angled position of projector 101 in the directions of the left-right axis and the front-back axis with respect to the level plane of the reference plane of projector 101. Projection unit 1017 has lens controller 1018 that controls a shift amount, a zoom amount, and a focus amount of a lens.

Figure 3:
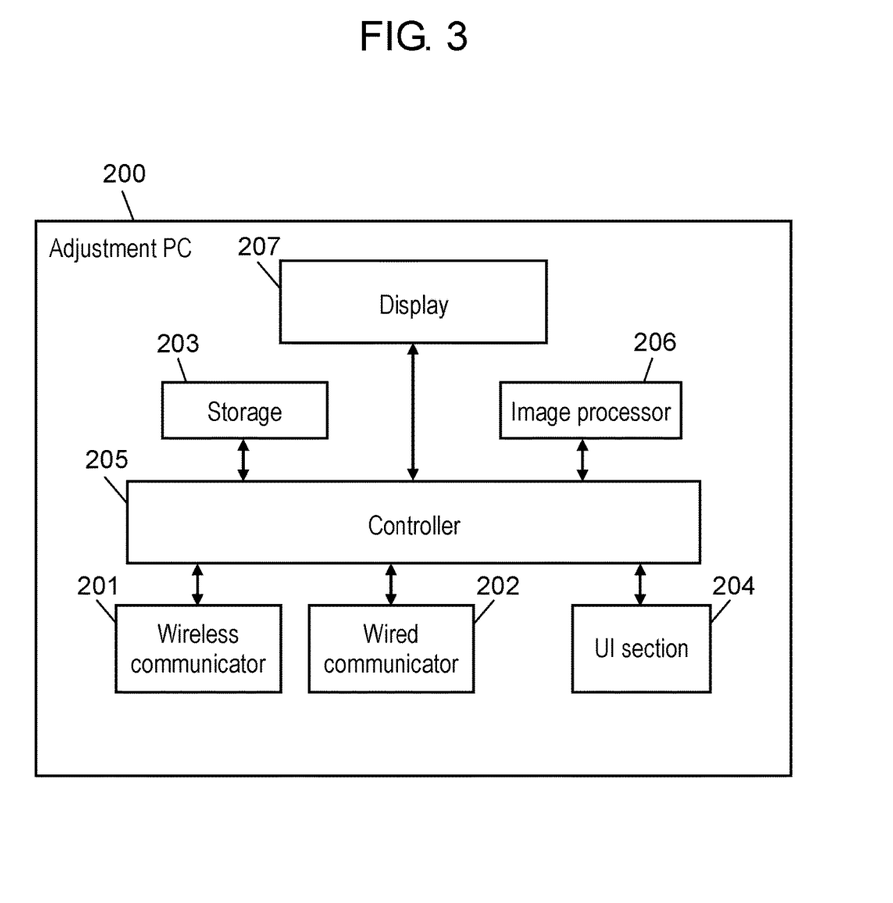
FIG. 3 is a functional block diagram of an adjustment PC.

FIG. 3 is a functional block diagram of adjustment PC 200 in the embodiment. Adjustment PC 200 has wireless communicator 201, wired communicator 202, storage 203, user-interface section (hereinafter, referred to as UI section) 204, controller 205, image processor 206, and display 207. Storage 203 stores programs, such as the operating system and applications, and various kinds of data, such as 3D modeling data on structure S and image data for projection. User-interface (UI) section 204 is a user interface that receives user's instruction such as selection. Controller 205 performs calculation on the programs and the data stored in storage 203. Image processor 206 creates image from image data. Display 207 displays windows and images of an application program. Adjustment PC 200 has commonly used hardware—wireless communicator 201 is formed of a wireless LAN unit; storage 203 is formed of a hard disk and RAM; UI section 204 is formed of a keyboard, a mouse; controller 205 is formed of a CPU; and display 207 is formed of a graphics board and a display connected to the board. Controller 205 is an example of the controller, and storage 203 is an example of the storage.

[1-2. Workings]

Figure 4:
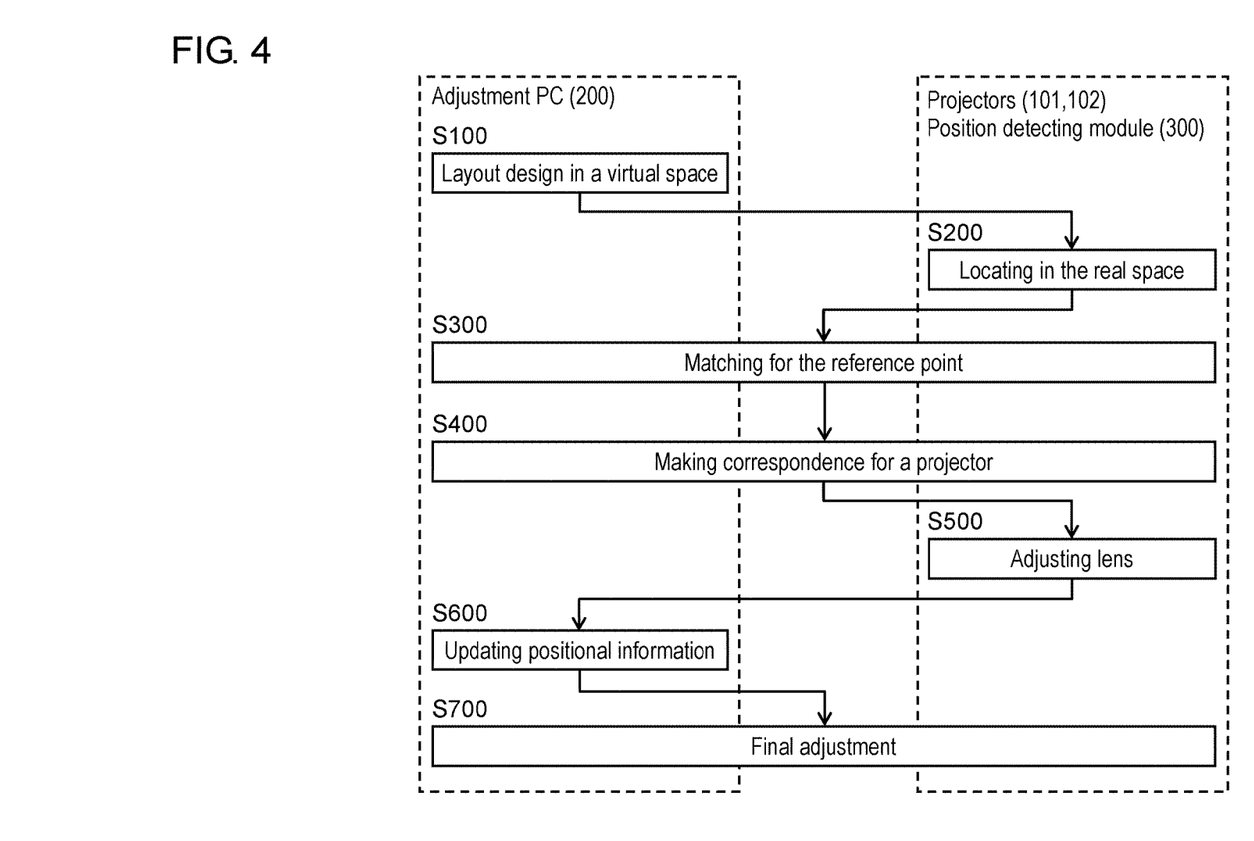
FIG. 4 is a flowchart illustrating the installation adjustment workflow for projecting an image onto an object.

Hereinafter, the workings of such structured projection image adjusting system 1 will be described. The flowchart of FIG. 4 illustrates the workflow for adjusting the installation (hereinafter, installation adjusting workflow) of projectors 101, 102 so as to fit projection image within a projection range of structure S. FIG. 4 shows processes to be performed in adjustment PC 200 on the left side and shows processes to be performed in projectors 101, 102 or position detecting module 300 on the right.

In the step S100 of the installation adjusting workflow, adjustment PC 200 performs, with use of an application program, layout design of the projector as an optimal form in a virtual space. Specifically, 3D modeling data on structure S on which image is to be projected in the real space is read into the application program. The 3D modeling data on structure S may be CAD data on structure S or may be data obtained by 3D measurement on site. Next, the models of projectors 101, 102 (hereinafter, referred to as a projector model as necessary) are placed in the virtual space, and the position of each projector model, installation angle, and a zoom ratio of a lens are adjusted so as to fit structure S entirely in the projection range.

Figure 5:
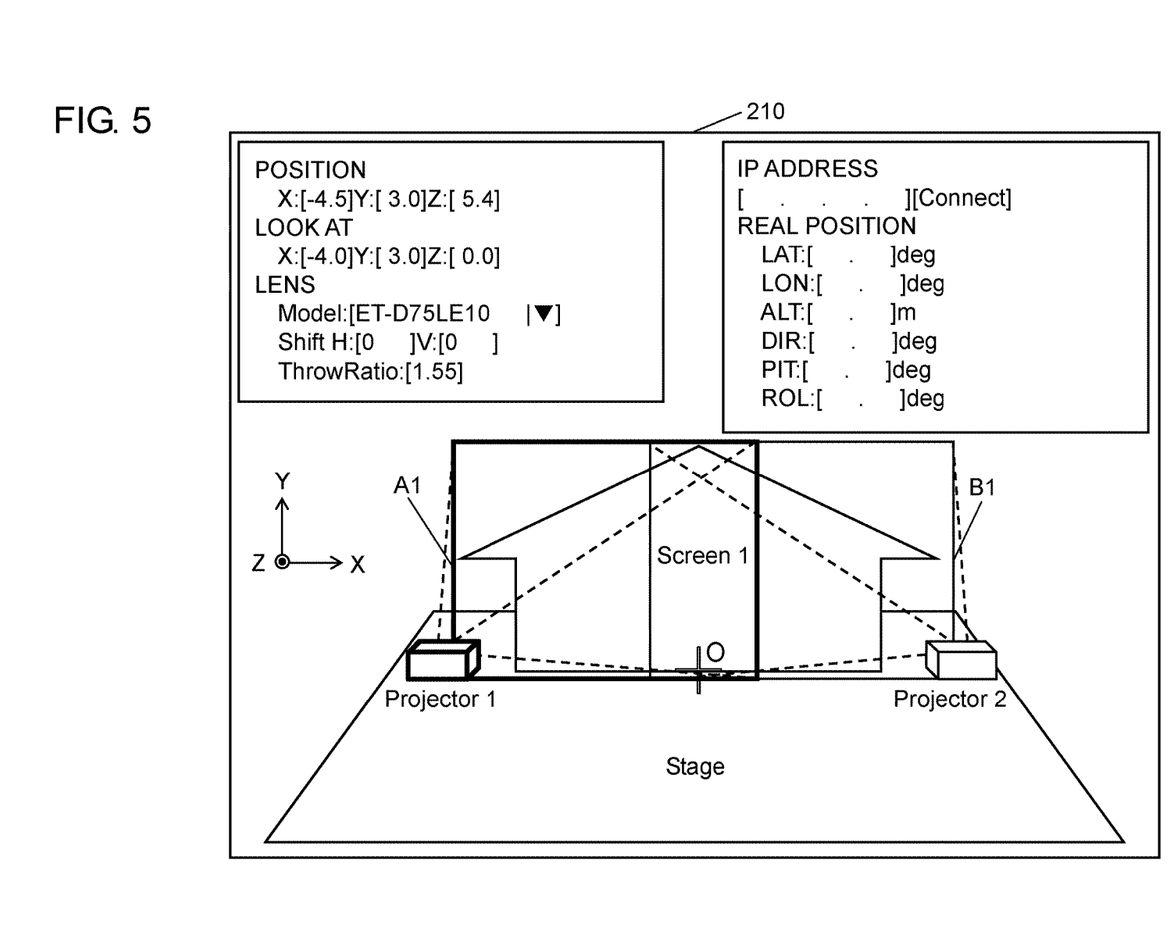
FIG. 5 shows an application window for layout design in a virtual space.

FIG. 5 is an example of window 210 of an application program shown in display 207 of adjustment PC 200. The model of structure S—represented by 3D modeling data that has been read into the application program—is shown as 'Screen1' (ID name), and the center of the lower end of the model is positioned at origin O, i.e., (X, Y, Z)=(0, 0, 0). The projector model corresponding to projector 101 is shown as 'Projector1' (ID name) and is disposed in a virtual space. Similarly, the projector model corresponding to projector 102 is shown as 'Projector2' (ID name) and is disposed in the virtual space. The plane shown by 'Stage' (ID name) in the virtual space is the reference plane (Y=0), which corresponds to the horizon plane in the real space. In the description below, the projector model shown as 'Projector1' (ID name) may be simply referred to as 'Projector1', and similarly, the projector model shown as 'Projector2' (ID name) may be simply referred to as 'Projector2'. Projection area A1 and Projection area B1, which are projected by 'Projector1' and 'Projector2', respectively, are shown in window 210.

Of the two projector models shown in the window, the user can choose either of them by positioning the mouse pointer over a desired model and clicking. FIG. 5 shows a state where the projector model of 'Projector1' has been chosen. When the user chooses 'Projector1', adjustment PC 200 highlights the projector model of 'Projector1' and projection area A1 by heavy line in the window of the application program, and shows the information on the chosen projector model (i.e., 'Projector1') in the upper left box in window 210. In the upper right box in window 210, information on projector 101 in the real space that corresponds to 'Projector1' in the virtual space, which will be described later.

The items shown in the left box will be described below. The item of 'POSITION' represents the position of 'Projector1' (as the chosen projector model in the window) in the virtual space. FIG. 5 shows the position of 'Projector1' as a distance from origin O (i.e., as a coordinate value). The item of 'LOOK AT' represents the position of projection image projected by 'Projector1'. 'Projector1' projects an image such that the center of the image to be projected agrees with the position shown by 'LOOK AT'. The information shown by 'POSITION' and 'LOOK AT' determines the projecting direction of the projector model. The information shown by the items of 'POSITION' and 'LOOK AT' is an example of the virtual-environment setting information.

The item of 'LENS' in window 210 shows information on the lens used for 'Projector1', having the following sub items: 'Model'; 'Shift'; and 'ThrowRatio'. The item of 'Model' shows a model number of the lens of 'Projector1'. The user can select a desired model number from multiple options, and according to the selected model number, the setting range of a zoom factor (a zoom amount) that will be described below is determined. The item of 'Shift' shows how much amount the image is shifted by the shifting function of the lens (a shifting amount) with respect to the position shown by 'LOOK AT' at which 'Projector1' projects the image. The item of 'ThrowRatio' shows a zoom factor of the lens. When the projector is disposed away from the projection wall by distance D and the lateral length of the projection range of the projector is represented by width W, the value of 'ThrowRatio' is obtained by D/W. The shifting amount that 'Shift' shows and the zoom factor that 'ThrowRatio' shows are an example of the control set-up value.

Similarly, when the user chooses 'Projector2' shown in window 210 by clicking, adjustment PC 200 highlights 'Projector2' and projection area B1 by heavy lines; and at the same time, PC 200 shows each item of 'POSITION', 'LOOK AT', and 'LENS'. Adjusting each item described above allows 'Projector1' and 'Projector2' to cover the entire range of 'Screen1'.

When the adjustment in step S100 of FIG. 4 is completed, the user locates projectors 101 and 102 in the real space in step S200. Specifically, prior to the installation, the user outputs a drawing derived from the setting values having undergone adjustment in the virtual space (in step S100). With reference to the setting values in the drawing, such as the position, direction, and tilt of projectors 101 and 102, the user locates bases T, and projectors 101 and 102 in the real space. At the same time, the user locates position detecting module 300 at a position that corresponds to origin O in the virtual space. When the installation is completed, the user connects between adjustment PC 200 and projectors 101, 102 by network cable L and video-signal cable V, and connects between adjustment PC 200 and position detecting module 300 by air.

Next, in step S300, the user performs matching between the reference point in the real space and origin O as the reference point in the virtual space of adjustment PC 200. According to the structure of the embodiment, origin O in the virtual space is located at the center of the lower end of the projection wall of the modeling data on structure S. The user performs positional matching between origin O in the virtual space and position detecting module 300 disposed at the reference point in the real space.

Figure 6:
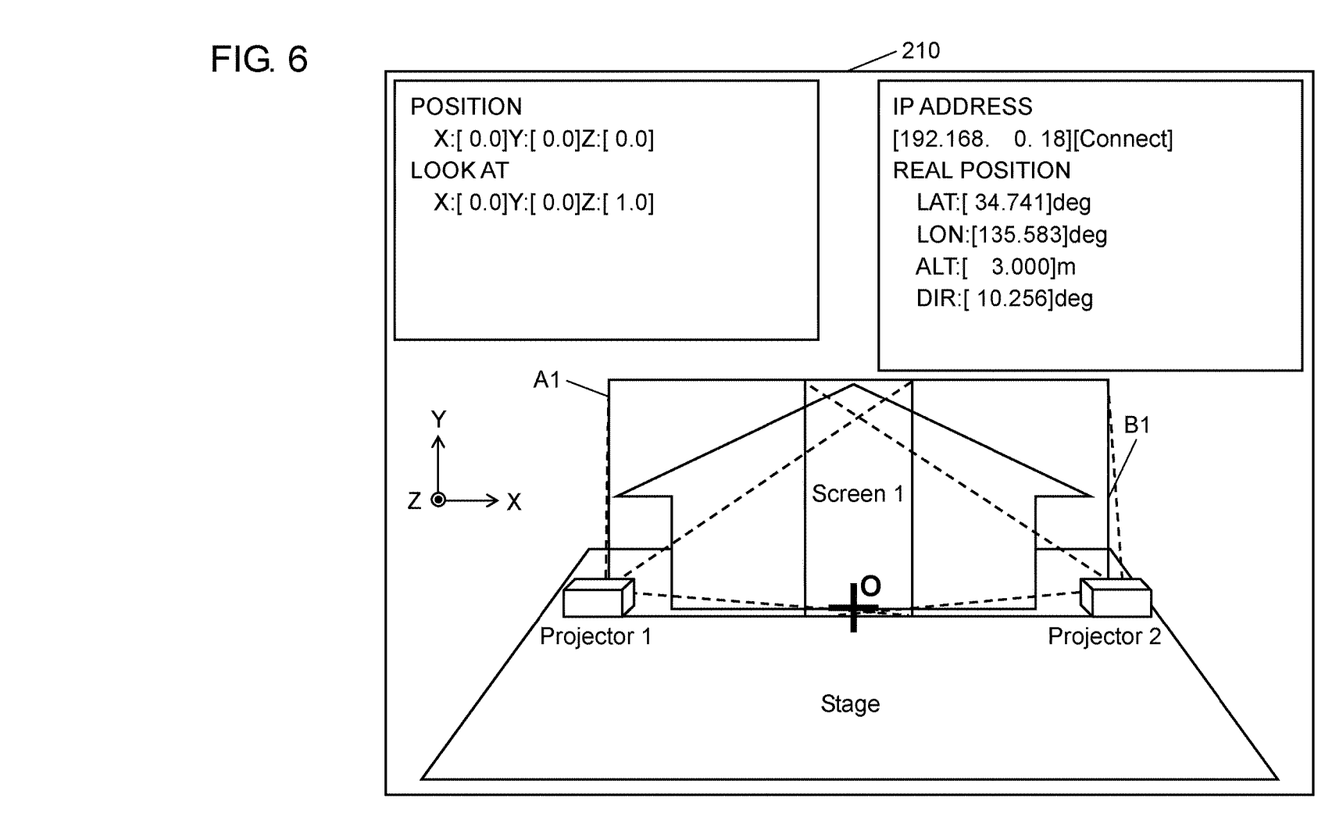
FIG. 6 shows an application window for making correspondence between the virtual space and the real space.

FIG. 6 shows an example of window 210 of the application program for the matching operation of the reference points. When the user puts the mouse pointer over the cross line showing origin O and clicks, the cross line is highlighted by heave lines and the window is put into the selection mode. The application program shows input areas (of the left and right boxes in the upper section of the window) for the matching operation; specifically, the left box contains information on the virtual space, whereas the right box contains information on position detecting module 300 in the real space. For example, suppose that position detecting module 300 of the embodiment has an IP address of '192.168.0.18'. When the user sets the IP address at 'IP ADDRESS' in the right box and pushes the 'Connect' button, adjustment PC 200 starts communicating with position detecting module 300. When the connection between them is established, adjustment PC 200 reads out information on the position/direction (i.e., latitude LAT, longitude LON, altitude ALT, and direction DIR) from position detecting module 300 and shows the values. Further, based on the read-out values, adjustment PC 200 calculates the location as coordinate data and the direction of position detecting module 300, making correspondence between the calculated coordinate position and origin O, and between the calculated direction and the z-axis direction in the virtual space.

Figure 7:
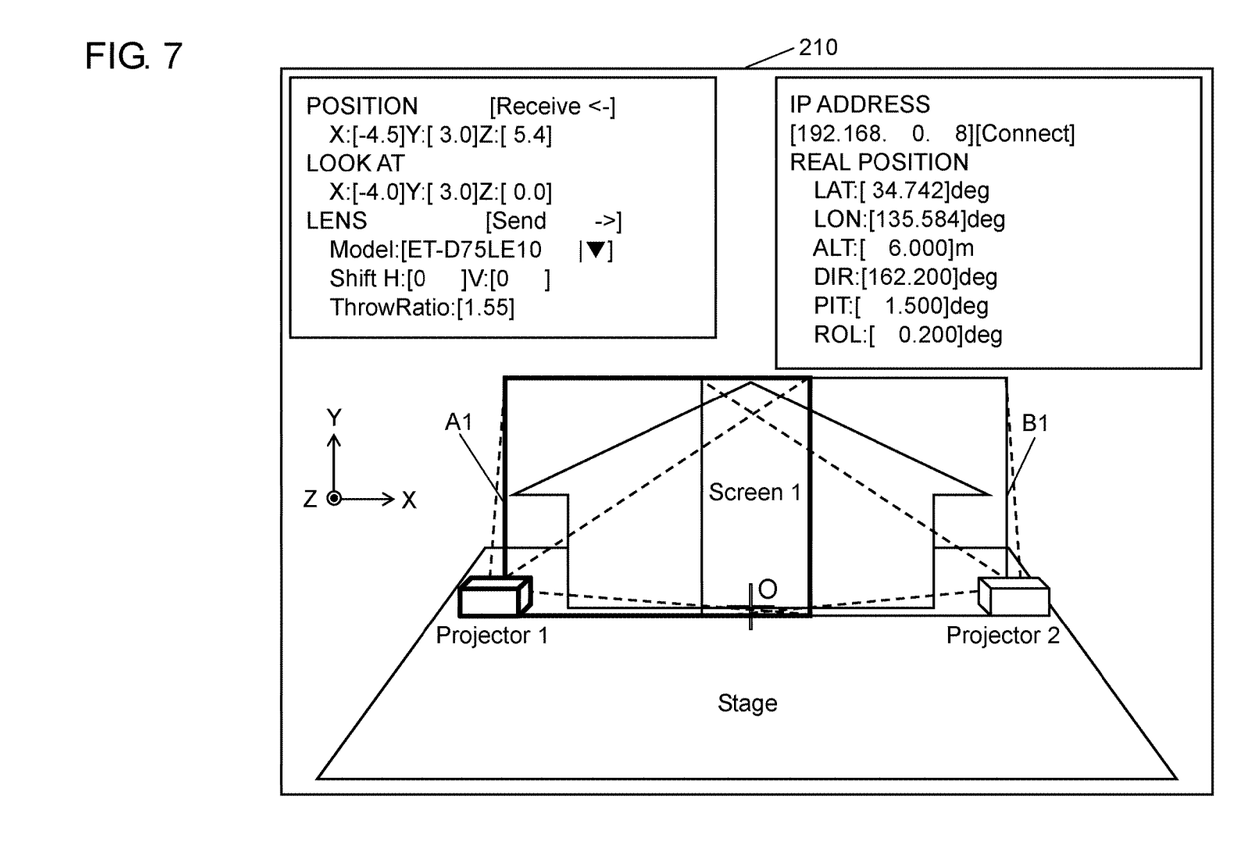
FIG. 7 shows an application window for connecting projectors.

Next, in step S400, adjustment PC 200 makes correspondence between a projector model in the virtual space and a projector in the real space, i.e., between 'Projector1' and projector 101; and between 'Projector2' and projector 102. FIG. 7 shows an example of window 210 of the application program for making correspondence between 'Projector1' as a projector model in the virtual space and projector 101 in the real space. For example, FIG. 7 shows a state in which 'Projector1' is being selected. Suppose that the IP address is '192.168.0.8' in the embodiment. When the user sets the address to 'IP ADDRESS' in the upper right box and pushes the 'Connect' button, adjustment PC 200 starts communicating with projector 101. When the connection between them is established, adjustment PC 200 reads out information on the position/direction (i.e., latitude LAT, longitude LON, altitude ALT, direction DIR, pitch PIT showing lateral tilt, and roll ROL showing longitudinal tilt) from posture/position detector 1016 of projector 101 and shows the values.

Adjustment PC 200 also shows the 'Receive' button next to 'POSITION' and the 'Send' button next to 'LENS' in the left box showing layout information on 'Projector1' in the virtual space, which makes correspondence between projector 101 in the real space and 'Projector1' in the virtual space. The procedures described above are also applied to make correspondence between 'Projector2' in the virtual space and projector 102 in the real space.

Next, in step S500, adjustment PC 200 transfers information on the lens—that has been defined in the virtual space by adjustment PC 200 in step S100—to projectors 101 and 102 in the real space. Specifically, when the user pushes the 'Send' button additionally shown next to 'LENS' in FIG. 7, adjustment PC 200 sends the shift amount, the zoom factor, and the focus value (focus amount) of the lens that have been defined in the virtual space to projector 101 in the real space. According to the shift amount, the zoom factor, and the focus value received from adjustment PC 200, projector 101 provides the lens mounted on it with automatic adjustment.

Although it is not shown, the adjustment for a lens of projector 102 is also performed in the same manner. Under the state where the correspondence between 'Projector2' and projector 102 has been made and 'Projector2' is being selected, when the user pushes the 'Send' button, adjustment PC 200 sends the shift amount, the zoom factor, and the focus value (focus amount) of the lens for 'Projector2' that have been defined in the virtual space to projector 102 in the real space. According to the shift amount, the zoom factor, and the focus value received from adjustment PC 200, projector 102 provides the lens mounted on it with automatic adjustment.

In step S200 of FIG. 4, the projectors are manually located at a place by the user; the position and the direction of the projectors may not agree with those of the projector models in the virtual space. In step S600, according to the information on the position/direction of projectors 101 and 102 in the real space, adjustment PC 200 updates positional information (i.e., information on the position/direction of Projectors 1 and 2) on the projector models. Specifically, when the user pushes the 'Receive' button additionally shown next to 'POSITION' in the left box of FIG. 7, adjustment PC 200 calculates the values of 'POSITION' and 'LOOK AT' and updates them, based on the positional information on projector 101 shown in the right box of FIG. 7 and the positional information on position detecting module 300 shown in the right box of FIG. 6. These values are calculated by commonly used geometrical operation. In the description, each value of 'POSITION' and 'LOOK AT' before updating is an example of the virtual-environment setting information, whereas each value of 'POSITION' and 'LOOK AT' after updating is an example of the real-environment setting information. The item of 'LENS' shows information on the lens mounted on a currently selected projector model. Position detecting module 300, posture/position detector 1016, and controller 205 is an example of the receiving section that obtains the real-environment setting information.

Figure 8:
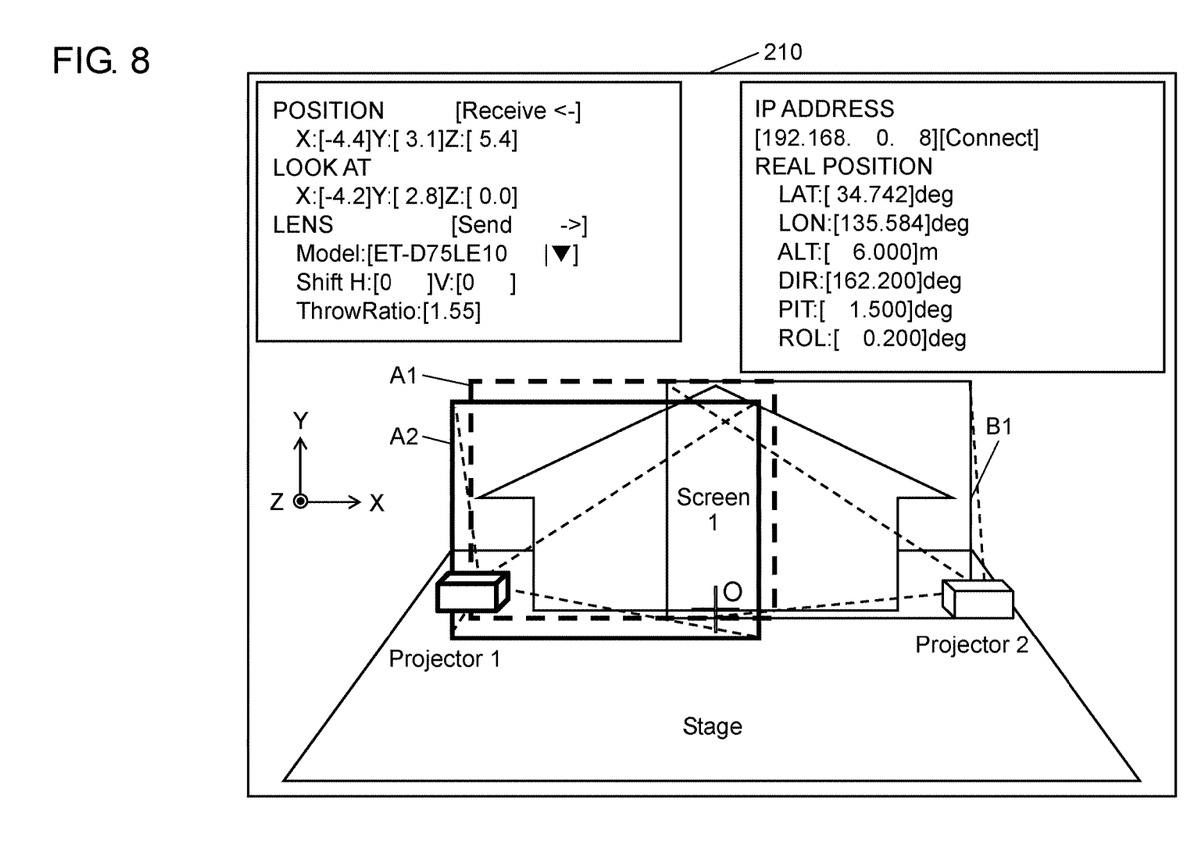
FIG. 8 shows an application window for updating layout information in the virtual space according to layout information in the real space.

FIG. 8 shows an example of window 210 of the application program. The window shows a state where the information on the position/direction of 'Projector1' as a projector model in the virtual space has been updated, based on the information on the position/direction of projector 101 in the real space. As shown in the left box of FIG. 5, 'POSITION' is defined as (X, Y, Z)=(−4.5, 3.0, 5.4) and 'LOOK AT' is defined as (X, Y, Z)=(−4.0, 3.0, 0.0) in the virtual space. However, according to the result of calculation based on the positional information of projector 101 in the real space, the aforementioned values are updated as follows: the value of 'POSITION' is (X, Y, Z)=(−4.4, 3.1, 5.4); and the value of 'LOOK AT' is (X, Y, Z)=(−4.2, 2.8, 0.0). In the window, projection area A2 that reflects the updated values is shown by heavy (solid) lines, whereas desired projection area A1 is shown by bold broken lines, which allows the user to know a positional difference between currently set projection area A2 and desired projection area A1.

Next, in step S700, adjustment PC 200 performs final adjustment for projector 101 so that currently set projection area A2 covers desired projection area A1. Specifically, according to the positional information (virtual-environment setting information) at the stage of layout design (in step S100) and the positional information (real-environment setting information) at the stage of updating real-space positional information (step S600), adjustment PC 200 calculates an amount of difference in the center position and size between desired projection area A1 and currently set projection area A2. The amount of difference in the center position and size between desired projection area A1 and currently set projection area A2 is an example of the difference between the image projection state in the real space and a desired image projection state. Adjustment PC 200 calculates a control set-up value (i.e., 'Shift' and 'ThrowRatio' of the item of 'LENS' of 'Projector1') for minimizing the amount of difference in the center position and size between desired projection area A1 and currently set projection area A2. These values are obtained geometrically, and after calculation, the obtained values are automatically shown at 'Shift' and 'ThrowRatio' of the item of 'LENS' of 'Projector1' as a projector model in the left box in window 210. That is, the control set-up value (i.e., 'Shift' and 'ThrowRatio' of the item of 'LENS' of 'Projector1') is corrected. In addition to the values above, a focus value of a lens may be corrected as the control set-up value.

When the user pushes the 'Send' button disposed next to the item of 'LENS', adjustment PC 200 sends the updated (corrected) values—a shift amount of a lens (i.e., 'Shift'), a zoom factor (i.e., 'ThrowRatio'), and a focus value—to projector 101 in the real space. According to the shift amount of a lens (i.e., 'Shift'), the zoom factor (i.e., 'ThrowRatio'), and the focus value received from adjustment PC 200, projector 101 provides the lens with automatic adjustment. Through the final adjustment described above, projection area A2 in the real space is automatically corrected so as to agree with (or so as to minimize the amount of difference from) desired projection area A1 in the virtual space. In step S700, final adjustment for projector 102 can be similarly performed; in that case, the user selects 'Projector2' as a projector model in window 210.

According to the structure of the embodiment, as for a positional difference that is directly uncontrollable by adjustment PC 200 and has difficulty in adjustment at a later time, such as the position and the tilt of a projector located in the real space, adjustment PC 200 reads the aforementioned values in the real space and corrects a controllable item, for example, a shift amount and a zoom factor of a lens. Such a correction allows the real space and the virtual space to make correspondence with each other.

The structure above greatly decreases the time and effort when the user installs and makes adjustment for projectors 101 and 102 so as to agree with the predetermined layout that has designed in the virtual space.

[1-3. Effect]

Projection image adjusting system 1 of the embodiment has storage 203, a receiving section (i.e., position detecting module 300, posture/position detector 1016, and controller 205), and controller 205. Storage 203 stores virtual-environment setting information on the set-up situation of projectors 101 and 102 so as to have a desired image-projection state on an object on which image is projected in a virtual space created by adjustment PC 200, and also stores a control set-up value for projectors 101 and 102. The receiving section receives real-environment setting information that shows the set-up situation of projectors 101 and 102 in the real space. Based on the virtual-environment setting information and the real-environment setting information, controller 205 corrects the control set-up value so as to eliminate a difference between the image-projection state in the real space and a desired image-projection state. Based on the corrected control set-up value, controller 205 controls the workings of projectors 101 and 102.

In the structure above, the virtual-environment setting information shows the set-up situation of projectors 101 and 102 when a desired image-projection state with respect to an object on which image is projected is obtained through simulation in the virtual space, whereas the real-environment setting information shows the set-up situation of projectors 101 and 102 in the real space. Based on the virtual-environment setting information and the real-environment setting information, controller 205 corrects the control set-up value so as to eliminate a difference between the image-projection state in the real space and a desired image-projection state. Further, based on the corrected control set-up value, the workings of projectors 101 and 102 are automatically controlled, by which installation and adjustment for projectors 101 and 102 is simplified.

In the exemplary embodiment, the control set-up value is at least any one of a shift amount, a zoom amount, and a focus amount of the lens of projectors 101 and 102. Based on the control set-up value, projectors 101 and 102 control the lens. Controlling the lens of projectors 101 and 102 provides an appropriate image projection suitable for the set-up position of projectors 101 and 102 with in the real space.

Other Exemplary Embodiments

In the first exemplary embodiment, projectors 101 and 102 (as a projection display apparatus) drive the lens according to the control set-up value. However, the structure is not limited to the above. When bases T for projectors 101 and 102 are structured so as to be movable in the directions of the X-axis, the Y-axis, and the Z-axis, projectors 101 and 102 with the bases can be moved in the directions of the X-axis, the Y-axis, and the Z-axis, according to the control set-up value, for example. Further, according to the control set-up value, bases T may be moved and the lens may be driven. For example, when adjustment for a projection range is not satisfactorily achieved by lens-driving only, movable bases T may be a help to the adjustment. Further, bases T may be formed separate from the projectors. In that case, bases T may be moved by direct control of adjustment PC 200, or adjustment PC 200 may control the projectors so as to move on fixed bases T.

Further, as another possibility, when a desired image projection is obtained on a projection object in the virtual space, the shape and the size of the projection image is stored in storage 203. In that case, based on the virtual-environment setting information and the real-environment setting information, controller 205 corrects the shape and the size of the stored projection image so as to minimize the difference between the image-projection state in the real space and a desired image-projection state. After correction, the corrected projection image is projected by projectors 101 and 102. The specific structure will be described below.

Projection image adjusting system 1 has storage 203, a receiving section (i.e., position detecting module 300, posture/position detector 1016, and controller 205), and controller 205. Storage 203 stores virtual-environment setting information on the set-up situation of projectors 101 and 102 so as to have a desired image-projection state on an object on which image is projected in a virtual space created by adjustment PC 200, and also stores the shape and the size of the projection image in the desired image-projection state. The receiving section receives real-environment setting information that shows the set-up situation of projectors 101 and 102 in the real space. Controller 205 creates projection image, and the image is projected by projectors 101 and 102. Based on the virtual-environment setting information and the real-environment setting information, controller 205 corrects the shape and the size of the stored projection image so as to minimize a difference between an image-projection state in the real space and a desired image-projection state. The corrected projection image is projected by projectors 101 and 102.

The structure above differs from that of the first exemplary embodiment in that there is no need for driving the lens of projectors 101 and 102, allowing projectors 101 and 102 to have a simplified structure and to have easy installation and adjustment.

Although the structure of the first exemplary embodiment projects an image onto a 3D object by using two projectors (i.e., projector 101 and projector 102), but the number of projectors is not limited to two; only one or three-or-more projectors can be employed.

The structure of the embodiment has been described in detail as an example of the technology of the present disclosure with reference to accompanying drawings.

In addition to a component essential for solving problems, the accompanying drawings and the in-detail description can contain a component used for illustrative purpose in the technology but not essential for solving problems. It will be understood that not all the components described in the drawings and description are essential for solving problems.

Further, it will be understood that the aforementioned embodiment is merely an example of the technique of the present disclosure. That is, the technique of the present disclosure is not limited to the structure described above, allowing modification, replacement, addition, and omission without departing from the spirit and scope of the claimed disclosure.

INDUSTRIAL APPLICABILITY

The present disclosure is extensively used for a technique that supports installation and adjustment of a projection display apparatus.

What is claimed is:

1. A projection image adjusting system comprising:
a storage for storing virtual-environment setting information which indicates in a virtual space created by a computer, a set-up situation of a projection display apparatus set so as to have a desired image state on an object on which an image is projected, and also storing a control set-up value for the projection display apparatus in the desired image state;
a receiving section for receiving real-environment setting information on a set-up situation of the projection display apparatus in a real space; and
a controller for controlling the projection display apparatus in the real space,
wherein, based on the virtual-environment setting information and the real-environment setting information, the controller corrects the control set-up value so as to decrease a difference between an image-projection state in the real space and the desired image state, and based on the corrected control set-up value, the controller controls the projection display apparatus in the real space.

2. The projection image adjusting system of claim 1, wherein the control set-up value is at least any one of a shift amount, a zoom amount, and a focus amount of a lens of the projection display apparatus, and based on the corrected control set-up value, the projection display apparatus controls the lens.

3. The projection image adjusting system of claim 1, wherein the projection display apparatus has a movable base, the control set-up value represents a moving amount of the projection display apparatus, and based on the corrected control set-up value, the projection display apparatus moves the base.

4. The projection image adjusting system of claim 1, wherein the projection display apparatus is disposed on a movable base, the control set-up value represents a moving amount of the projection display apparatus, and based on the corrected control set-up value, the controller moves the base.

5. The projection image adjusting system of claim 1, wherein the projection display apparatus is disposed on a base so as to be movable, the control set-up value represents a moving amount of the projection display apparatus, and based on the corrected control set-up value, the controller moves the projection display apparatus.

6. The projection image adjusting system of claim 1, further comprising
a display device,
wherein the controller controls the display device to display a state which the projection display apparatus projects in the real space.

7. The projection image adjusting system of claim 6, wherein the state which the projection display apparatus projects in the real space is depicted by a figure.

8. The projection image adjusting system of clam 1, wherein the controller determines the reference position based on information received from a detecting module placed at the real space.

9. The projection image adjusting system of claim 8, wherein the controller calculates a coordinate and a direction of the detecting module based on the information received from the detecting module placed at the real space, and determines the identified position in the virtual space based on the calculated coordinate and direction.

10. The projection image adjusting system of claim 1, wherein the receiving section receives a position information of the projection display apparatus in the real space, and
the controller sets a position of a projection apparatus in the virtual space based on the position information of the projection apparatus in the real space.

11. The projection image adjusting system of claim 1, wherein the computer acquires a reference position in the real space corresponding to an identified position in the virtual space.

12. A projection image adjusting method comprising:
a storing step for storing virtual-environment setting information which indicates in a virtual space created by a computer, a set-up situation of a projection display apparatus set so as to have a desired image state on an object on which an image is projected, and a control set-up value for the projection display apparatus in the desired image state into a storage;
a receiving step for receiving real-environment setting information on a set-up situation of the projection display apparatus in a real space; and
a controlling step for controlling the projection display apparatus in the real space,
wherein, in the controlling step, based on the virtual-environment setting information and the real-environment setting information, the control set-up value is corrected so as to decrease a difference between an image-projection state in the real space and the desired image state, and the projection display apparatus in the real space is controlled, based on the corrected control set-up value.

13. The projection image adjusting method of claim 12, further comprising an acquiring step for acquiring a reference position in the real space corresponding to an identified position in the virtual space.

14. A projection image adjusting system comprising:
a storage for storing virtual-environment setting information which indicates in a virtual space created by a computer, a set-up situation of a projection display apparatus set so as to have a desired image state on an object on which an image is projected, and also storing a shape and a size of a projection image in the desired image state;
a receiving section for receiving real-environment setting information on a set-up situation of the projection display apparatus in a real space; and
a controller for creating a projection image and causing the projection display apparatus in the real space to project the projection image,
wherein, based on the virtual-environment setting information and the real-environment setting information, the controller corrects the shape and the size of the projection image stored in the storage so as to decrease a difference between an image-projection state in the real space and the desired image state, and causes the projection display apparatus inthe real space to project the corrected projection image.

15. The projection image adjusting system of claim 14, wherein the computer acquires a reference position in the real space corresponding to an identified position in the virtual space.

16. A projection image adjusting method comprising:
a storing step for storing virtual-environment setting information which indicates in a virtual space created by a computer, a set-up situation of a projection display apparatus set so as to have a desired image state on an object on which an image is projected, and a shape and a size of a projection image in the desired image state;
a receiving step for receiving real-environment setting information on a set-up situation of the projection display apparatus in a real space; and
a projection step for creating the projection image and then causing the projection display apparatus in the real space to project the projection image,
wherein, in the projection step, based on the virtual-environment setting information and the real-environment setting information, the shape and the size of the stored projection image is corrected so as to decrease a difference between an image-projection state in the real space and the desired image state, and the corrected projection image is projected by the projection display apparatus in the real space.

17. The projection image adjusting method of claim 16, further comprising an acquiring step for acquiring a reference position in the real space corresponding to an identified position in the virtual space.

* * * * *